(12) United States Patent
Pettersson et al.

(10) Patent No.: US 7,410,302 B2
(45) Date of Patent: Aug. 12, 2008

(54) PRESSURE COMPENSATING DEVICE FOR A BEARING HOUSING

(75) Inventors: Bjorn Pettersson, Vallda (SE); Filip Rosengren, Gothenburg (SE)

(73) Assignee: Aktiebolaget SKF, Gothenburg (SE)

( * ) Notice: Subject to any disclaimer, the term of this patent is extended or adjusted under 35 U.S.C. 154(b) by 258 days.

(21) Appl. No.: 11/210,747

(22) Filed: Aug. 25, 2005

(65) Prior Publication Data
US 2006/0045405 A1    Mar. 2, 2006

(30) Foreign Application Priority Data
Sep. 1, 2004    (SE) .................................. 0402111

(51) Int. Cl.
*F16C 33/66*    (2006.01)
(52) U.S. Cl. .................. 384/471; 384/462; 384/474
(58) Field of Classification Search .......... 384/462–475
See application file for complete search history.

(56) References Cited

U.S. PATENT DOCUMENTS

| | | | |
|---|---|---|---|
| 2,676,073 A | * | 4/1954 | Boden .......................... 384/459 |
| 4,039,229 A | * | 8/1977 | Ohlberg ....................... 384/471 |
| 4,778,285 A | * | 10/1988 | Larson ......................... 384/462 |
| 6,991,378 B2 | * | 1/2006 | Jacquemont et al. ........ 384/471 |
| 2006/0045405 A1 | | 3/2006 | Pettersson et al. |

FOREIGN PATENT DOCUMENTS

| | | |
|---|---|---|
| SE | 526 177 C2 | 7/2005 |
| SU | 429209 | 10/1972 |

OTHER PUBLICATIONS

U.S. Appl. No. 11/543,923, filed Oct. 6, 2006.

* cited by examiner

*Primary Examiner*—Thomas R Hannon
(74) *Attorney, Agent, or Firm*—Buchanan Ingersoll & Rooney PC

(57) ABSTRACT

The invention refers to a pressure compensating device (4) for a bearing housing, which is incorporating a sealed off compartment, and which device is intended to compensate pressure variations in the sealed off compartment, wherein the device (4) incorporates a housing (5, 6, 7), in which is positioned a bellows (9) of flexible material, which housing (4) has at least one first opening (10) through which the interior of the bellows (4) communicates with the side of the bearing housing where a varying pressure can be expected, and wherein the bellows (4) further is associated with an additional opening (8), adapted to allow the bellows (4) to alter its momentary form for compensating such pressure variations.

17 Claims, 5 Drawing Sheets

PRESSURE COMPENSATING DEVICE FOR A BEARING HOUSING

The present invention relates to pressure compensating device for a bearing housing, particularly for supporting rollers in continuous casting machines.

Rollers of continuous casting machines are used for supporting, forming and cooling a solidifying slab of material, fed out from a water-cooled mould. Thus the rollers are subjected to a particularly unfriendly environment, with the hot, water-cooled slab, scales and steam generated as the water is cooling off the slab. Furthermore the rollers are provided with internal siphone pipes for cooling water. Thus the rollers are subjected to varying temperatures and in order to reduce the effects of length changes caused by temperature variations, the rollers are axially subdivided in segments, which are supported in rolling bearings positioned in stands. At each axial end of a roller segment there is thus provided a bearing which is positioned in a housing compartment, which is sealed off on both sides. Between the ends of two roller segments facing each other the same sealed off compartment can incorporate the adjacent bearings for the ends of the two adjacent roller segments.

A problem is that the seals due to pressure differences building up during varied temperatures, can cause the seals to become displaced to such an extent that their sealing capacity is reduced or even lost.

The purpose of the present invention is to propose a pressure compensating device arranged to prevent such build up of pressure differences and this has been achieved in that the pressure compensating device has been given the characteristics defined in the accompanying claim 1.

Hereinafter the invention will be further described with reference to the accompanying drawings, schematically illustrating the device according to the invention.

Figure 1:
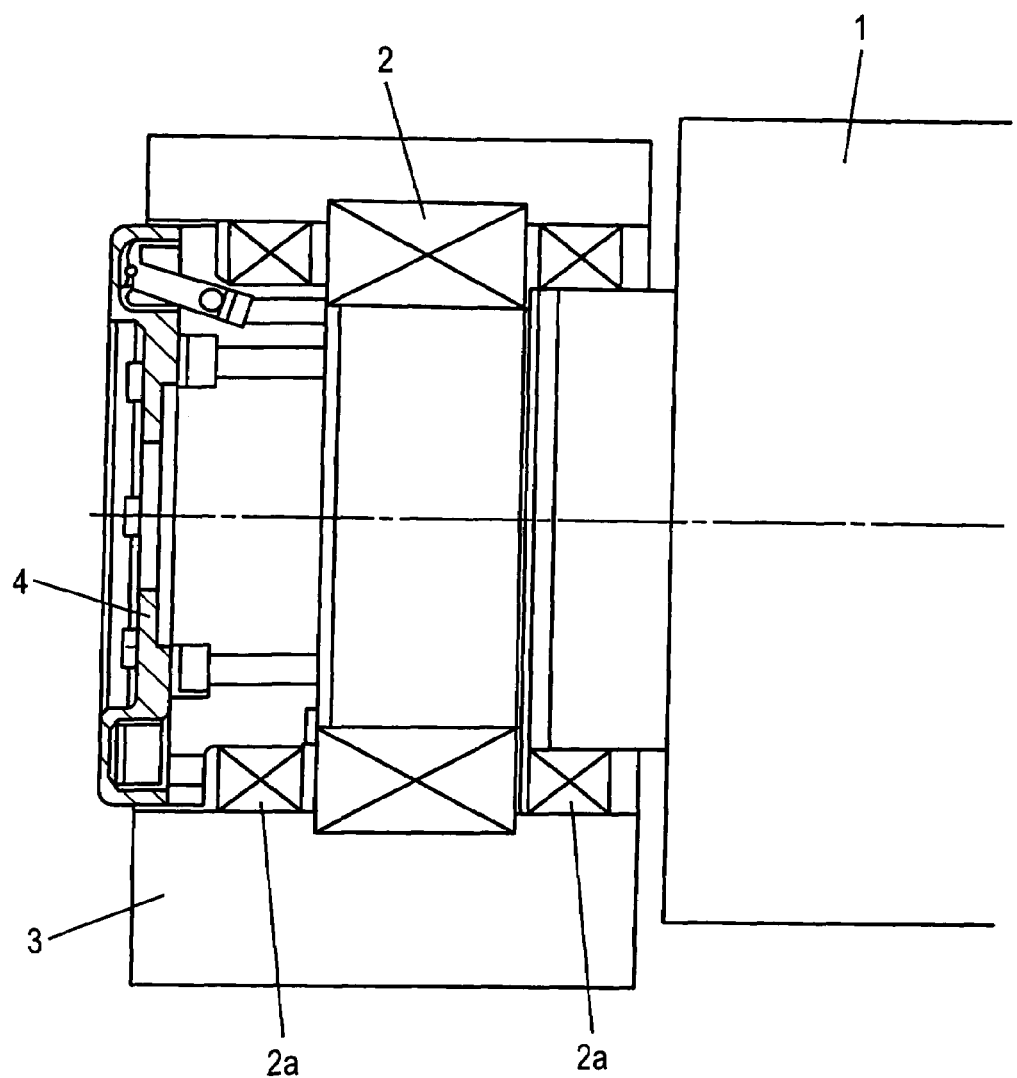
FIG. 1 illustrates schematically an end portion of a roll segment with a compensating device mounted at the free end of a roll segment.
Figure 2:
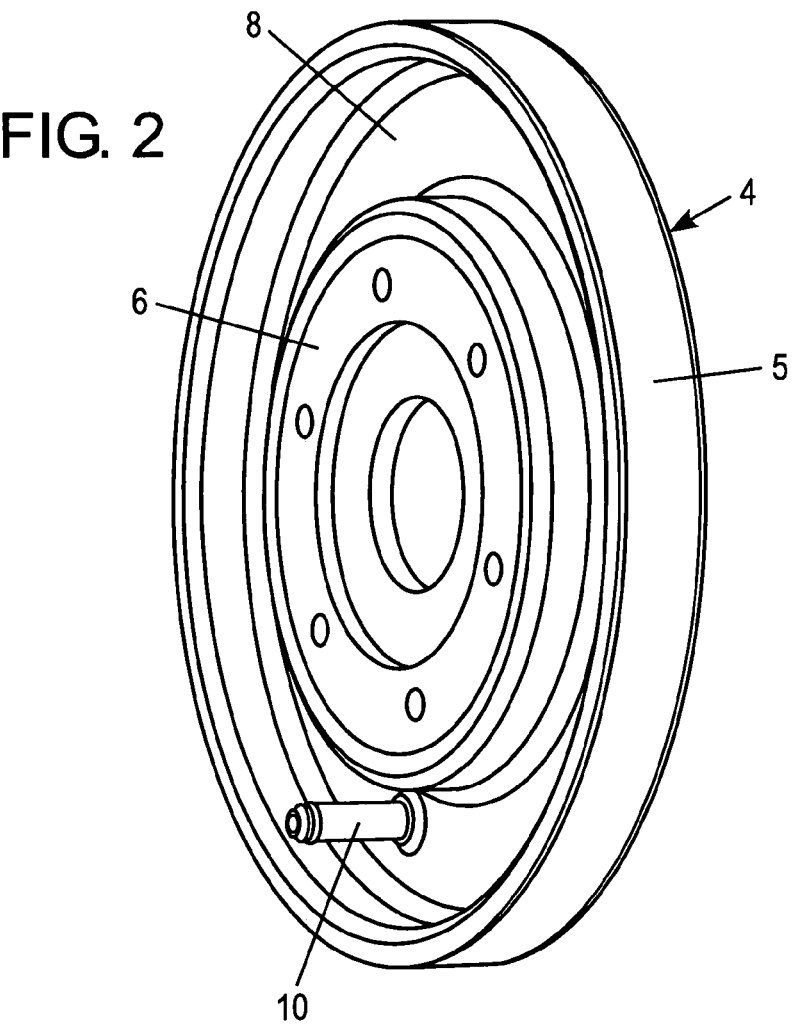
FIG. 2 is a perspective view of a first embodiment of the pressure compensating device according to the invention illustrated schematically in FIG. 1.
Figure 3:
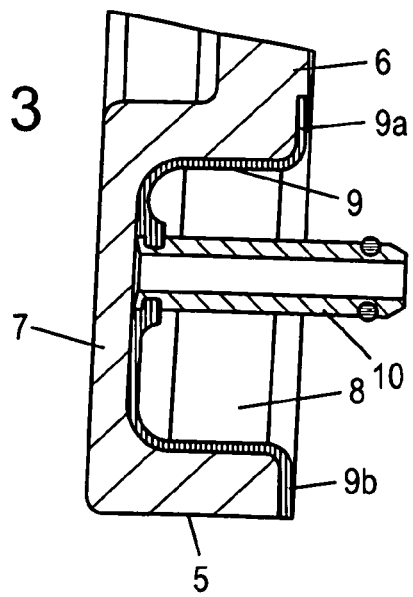
FIG. 3 is cross section of a portion of the compensating device shown in FIG. 1.

FIG. 1 illustrates in a schematic cross sectional view a portion of an end roller segment of a continuous caster roller 1, which is rotationally supported in a bearing 2, which has its outer race ring resting on a roll stand 3. Outside the bearing is provided a pressure compensator 4, acting to equalize the pressure within the space between the seals 2a, as the pressure varies inside the roll segment following temperature variations caused by the solidifying hot steel slab both due to contact against the outer envelope surface of the roll segment and due to convection from the hot steel slab. The pressure compensating device 4 is shown separate and in perspective in FIG. 2, and FIG. 3 shows a cross section of a portion of the device. In the embodiment shown, the compensating device 4 incorporates a wheel-formed body with an axially extending outer rim 5 and hub portion 6 interconnected with the rim 5 via a planar annular web 7 of smaller axial size than the rim 5. The annular web 7 is in plane with one side edge of the rim 5, whereas the hub portion has a first planar side surface, which is in plane with the opposite side edge of the rim 5, thereby creating an annular through-shaped channel 8 between the rim 5 and the hub member 6. In this annular through-shaped channel 8 is arranged a flexible bellows 9 having one side edge 9a firmly and air-tightly bonded to the first planar side surface of the hub portion 6, whereas the opposite side edge 9b thereof is firmly and air-tightly bonded to the planar side of the rim 5, which is in plane with the first side of the hub portion 6. The part of the flexible bellows situated between the side edges 9a, 9b being loosely arranged along the bottom of the through-shaped channel 8, without being connected thereto. The connection between the side edges 9a and 9b and their contact surfaces, can preferably be achieved by vulcanisation, but it is also possible to use glueing or another appropriate method giving durable, air-proof joints.

At a position between the side edges of the bellows 9 a tube 10 is inserted through the wall of the bellows for extending between the outside of the bellows 9 and the space between the bellows 9 and the bottom of the through-shaped channel 8. The end of this tube 10 projecting outside the bellows 9 is intended to be positioned with its open end in the area around the bearing 2, where pressure variations can occur, such as illustrated in FIG. 1.

If the pressure in the bearing region should raise, following a temperature increase, the increased pressure will propagate through the tube 10 and cause the bellows 9 to bulge outwards from the bottom of the through-shaped channel 8, thereby reaching a state of pressure equilibrium on both sides of the compensating device. In this manner the pressure difference will be compensated by the bellows 9. The pressure compensating device thus is designed as a cassette with a rigid supporting disc having an annular recess in which is positioned a bellows of a resilient, air-tight material, which has been bonded to the edges surrounding the recess, whereas the bellows is freely movable between the bonded edges. The bellows is therefore well protected and the fact that it can be delivered as a separate cassette, makes it easily mounted in correct position and with the parts in exact mutual positions in the bearing housing.

Figure 4:
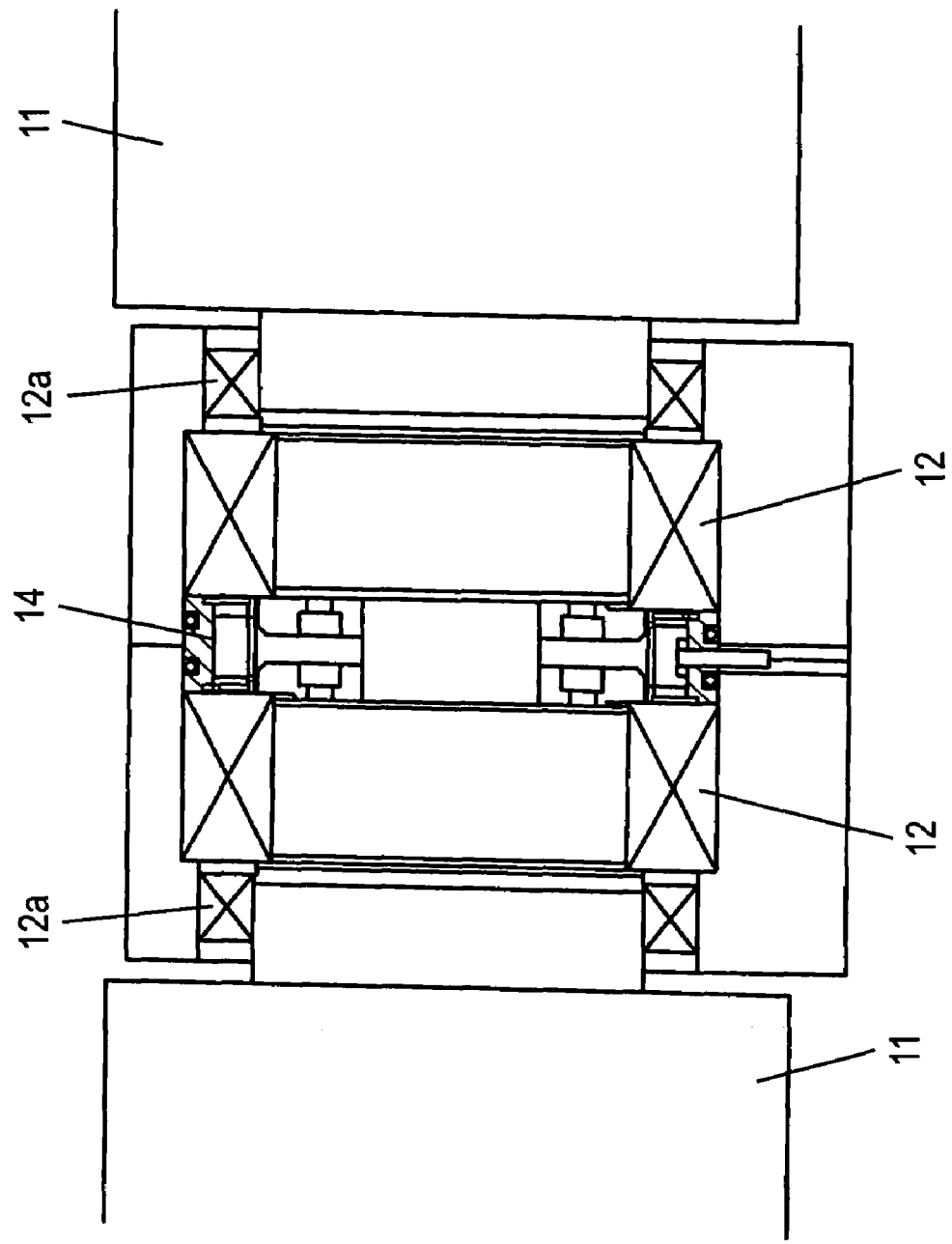
FIG. 4 is a schematic illustration of two roller segments, the ends of which are adjoining each other, and having an intermediate double-sided pressure compensating device according to the invention.

FIG. 4 shows in a very schematic sketch a portion of an area between two roll segments 11, each one being supported in roller bearings 12, and with a pressure compensating device 14 according to the invention, which is arranged to equalize pressure variations inside the space sealed off by seals 12a.

Figures 5, 6:
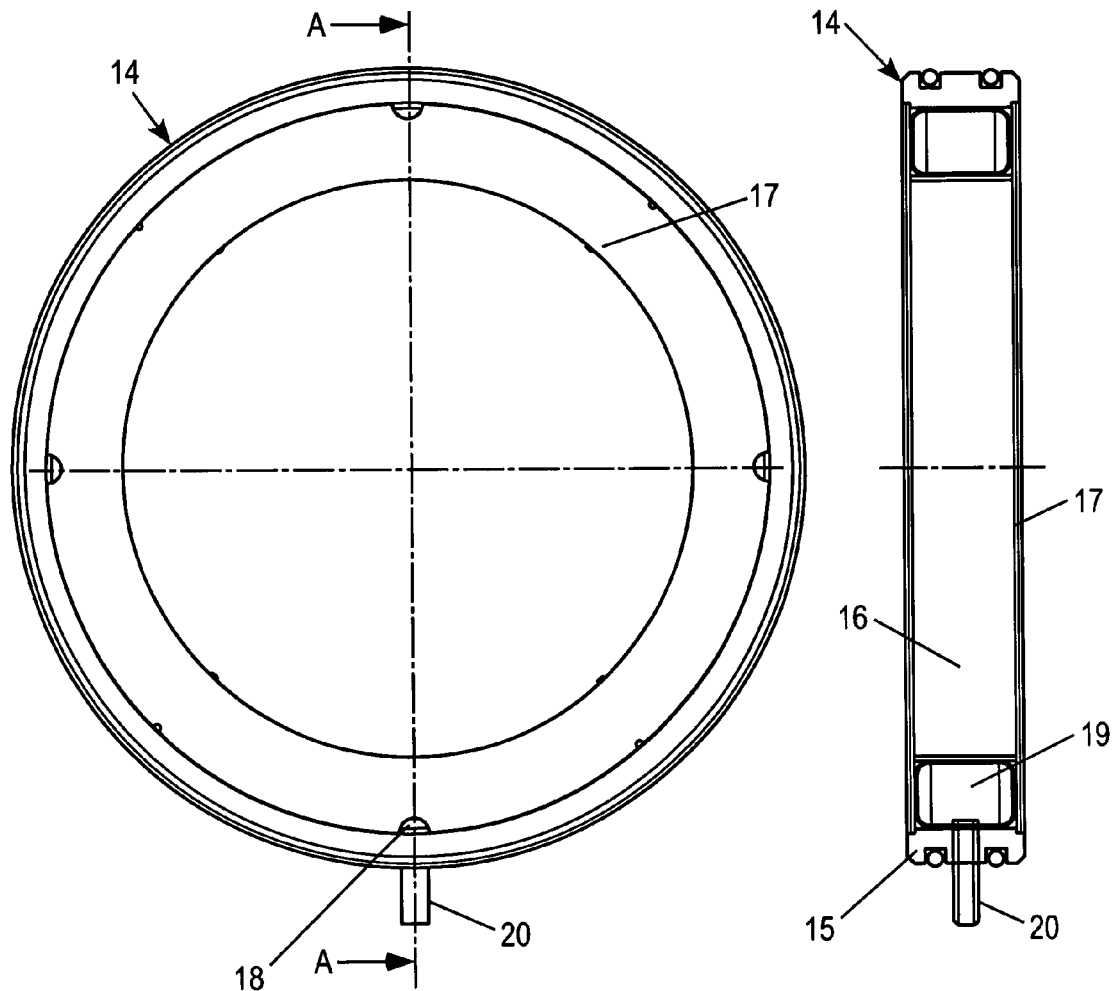
FIG. 5 is planar side view of the double-sided pressure compensating device illustrated in FIG. 4.
FIG. 6 is a cross section along line A-A in FIG. 5.

FIG. 5 is a side view of the pressure compensating device 14 illustrated in FIG. 4, and FIG. 6 is a cross section along line A-A in FIG. 5. The pressure compensating device 14 is constituted by a ring member forming an outer rim 15 in which is positioned a ring-shaped centre portion or hub 16, preferably made from thin sheet metal or plastic material. The outer rim 15 and the hub 16 are positioned in concentric relation to each other and form together an annular compartment. The device is provided with side walls 17 formed as annular end plates, extending over the annular compartment and having openings 18. In this compartment is loosely inserted a bellows 19 having an annular cross section and being of flexible material. The bellows is provided with a tube 20 arranged through an opening in the outer rim 15 and connecting the inside of the bellows 19 with the outside area.

Pressure variations in the sealed off compartment will result in a movement of the bellows 19, which is possible as the internal air can escape through the tube 20, until an equilibrium is reached.

The pressure compensating device 14 forms an integral unit, which can be assembled and delivered from the manufacturer for instance as a cassette, which can be mounted easily in correct position without need for particularly trained and experienced personnel.

Although the pressure compensating device according to the invention as described here above is easy to handle and efficient for compensating thermally influenced pressure variations in bearing housings, it can in some instances be difficult to use, as the bearing housing in some applications has such a small excessive space that the device can not be inserted therein.

Figure 7:
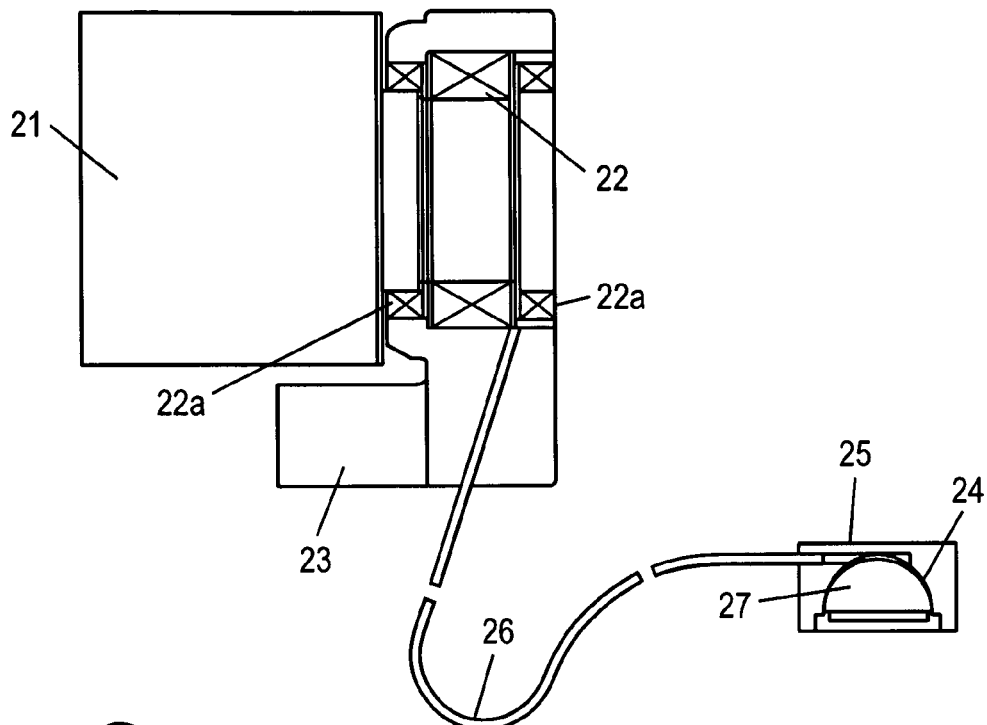
FIG. 7 illustrates schematically an end portion of a roll segment with another pressure compensating device according to the invention positioned remote from the bearing housing.

FIG. 7 shows schematically a portion of a roll segment 21 supported in a bearing 22 resting with its outer race ring on a roll stand 23, and being axially enclosed between sealing members 22a positioned on both sides of the bearing. In the illustrated embodiment, there is only little space available in the bearing housing surrounding the bearing 22 and for that reason there is arranged a pressure compensating device 24, positioned in its own housing 25, separated from the bearing housing and communicating with the interior of the bearing housing via a communication means in form of a hose 26 or the like. In this manner it is possible to provide a device compensating for pressure variations also in circumstances, where it is not possible for space reasons to arrange a pressure compensating device of the type illustrated in FIGS. 1-6 inside the roll segment or its bearing housing.

Figure 8:
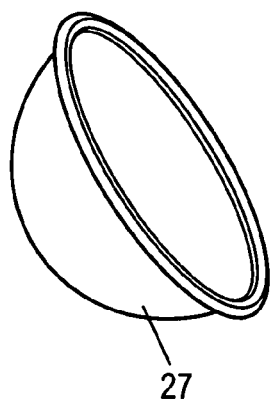
FIG. 8 is a perspective view in bigger scale of a bellows forming part of the pressure compensating device illustrated in FIG. 7.

As shown in FIG. 8, the main component of the pressure compensating device 24, is a bellows, here shown in perspective, and incorporating a semi-spherical cap 27 of a resilient material, such as rubber or an appropriate plastic material, which, when subjected to a pressure increase transferred from the bearing housing via the hose 26, will move to flatten out the curvature of the cap 27, thereby allowing excess air to enter into the housing 25 in order to compensate the increased pressure in the bearing housing.

Figure 9:
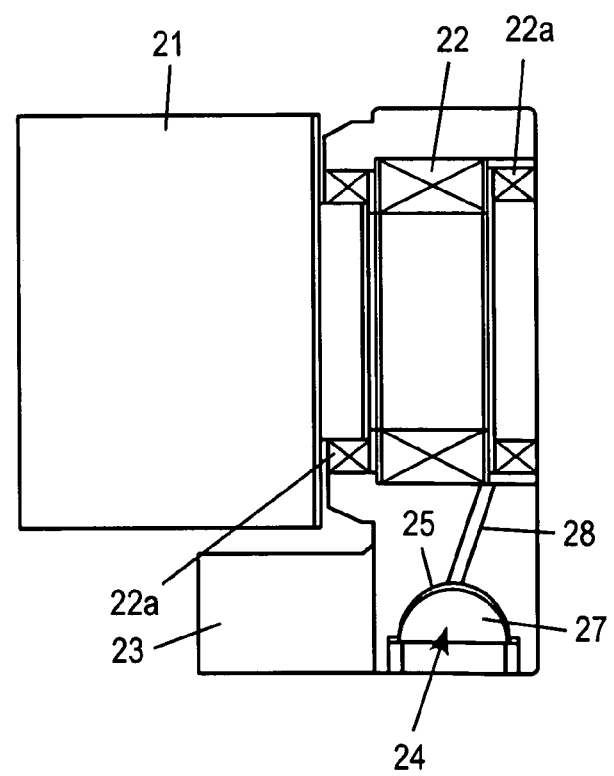
FIG. 9 is still another pressure compensating device according to the invention, positioned in the roll stand for the roll segment and communicating with the bearing housing supporting the roll segment.

In FIG. 9 finally is illustrated another embodiment of the pressure compensating device according to the invention, which can also be used in cases when the available space in the roll segment or in its bearing housing is so small that a pressure compensating device of cassette type can not be positioned therein. In this embodiment there is schematically shown a roll segment 21 supported in a bearing 22, which rests on a roll stand 23 and is enclosed in a bearing housing, the axial ends of which are sealed off via conventional seal members 22a. In this case there is provided in the bottom of the roll stand 23 a recess forming a housing 25, wherein is arranged a semi-spherical cap 27 of the same type as that illustrated in FIG. 8, whereby the housing 25 and the cap 27 together form a pressure compensating device 24, which communicates with the interior of the bearing housing via a duct 28 machined in the roll stand or a conduit interconnecting the interior of the bearing housing and the interior of the housing 25 of the pressure compensating device 24. The bellows forming the cap acts in the same manner as that illustrated and described in connection to FIG. 7.

The invention is not limited to the pressure compensating devices as illustrated in the accompanying drawings and described with reference thereto, but modifications and variants are possible within the scope of the attached claims. Furthermore the pressure compensating device has been shown and described in applications for continuous casting machines, but it is evident that the pressure compensating device can be used also in other applications where there is a motivation for making pressure compensation.

The invention claimed is:

1. A pressure compensating device for a bearing housing, which is incorporating a compartment sealed off by seals, and which device is intended to compensate pressure variations in the sealed off compartment, the device comprising a housing, in which is positioned a deformable bellows having an ability to change its form, the housing comprising at least one first opening through which an interior of the bellows communicates with a side of the bearing housing where a varying pressure is expected, and the bellows further being associated with an additional opening adapted to allow the bellows to alter its momentary form for compensating such pressure variations;

wherein the housing of the device incorporates an axially extending outer rim and a hub portion interconnected with the rim via a planar annular web of smaller axial size than the rim, and an annular trough-shaped channel provided between the rim and hub member, the annular trough-shaped channel forming said additional opening and being adapted to receive the flexible bellows.

2. A pressure compensating device as claimed in claim 1, wherein, the bellows and its associated housing are formed as a cassette ready insertable in position in the bearing housing.

3. A pressure compensating device as claimed in claim 2, wherein a single such pressure compensating device is associated with more than one sealed off compartment.

4. A pressure compensating device as claimed in claim 2, wherein a plurality of such pressure compensating devices is associated with a single sealed off compartment.

5. A pressure compensating device as claimed in claim 1, wherein edge portions of the flexible bellows are connected to edges of the outer rim and the hub portion in an air-proof manner, on opposite sides of the trough-shaped channel, whereas a portion of the bellows between said edge portions is arranged loosely to follow an interior of said through-shaped channel in order to be inflatable to move outwardly from said trough-shaped channel following a pressure increase at the first opening of the device.

6. A pressure compensating device as claimed in claim 5, wherein the first opening is a tube extending between the interior of the bellows and the sealed off compartment.

7. A pressure compensating device as claimed in claim 5, wherein a single such pressure compensating device is associated with more than one sealed off compartment.

8. A pressure compensating device as claimed in claim 5, wherein a plurality of such pressure compensating devices is associated with a single sealed off compartment.

9. A pressure compensating device as claimed in claim 1, wherein the first opening is a tube extending between the interior of the bellows and the sealed off compartment.

10. A pressure compensating device as claimed in claim 9, wherein a plurality of such pressure compensating devices is associated with a single sealed off compartment.

11. A pressure compensating device as claimed in claim 1, wherein the housing of the device encloses the bellows, which has a substantially annular cross section, and which housing has at least one first opening at each axial side thereof, the interior of the flexible bellows communicating with ambient air via a tube inserted in the bellows and forming the said additional opening, compensating pressure differences on opposite sides of the device by expelling air from the bellows until the pressure on both sides thereof is substantially the same.

12. A pressure compensating device as claimed in claim 11, wherein the bellows is loosely inserted in the housing in an annular compartment formed between an outer axially extending rim, an inner hub and side walls.

13. A pressure compensating device as claimed in claim 12, wherein the at least one first opening is formed in each one of the side walls.

14. A pressure compensating device as claimed in claim 1, wherein the device is positioned outside the bearing housing and communicates with this via a communicating means.

15. A pressure compensating device as claimed in claim 14 wherein the communicating means is one of a hose and a duct.

16. A pressure compensating device as claimed in claim 1, wherein a plurality of such pressure compensating devices is associated with a single sealed off compartment.

17. A pressure compensating device as claimed in claim 1, wherein a single such pressure compensating device is associated with more than one sealed off compartment.

\* \* \* \* \*